United States Patent [19]

Mock

[11] Patent Number: 5,409,039
[45] Date of Patent: Apr. 25, 1995

[54] REGULATING MECHANISM FOR THE SERVICE ADAPTER OF A SERVICE COUPLING COOPERATING WITH A CHARGING PORT PART

[76] Inventor: Bruno A. Mock, Buolterlistrasse 63, 6052 Hergiswil NW, Switzerland

[21] Appl. No.: 33,328

[22] Filed: Mar. 18, 1993

[30] Foreign Application Priority Data

Nov. 24, 1992 [CH] Switzerland .............. 03595/92

[51] Int. Cl.⁶ ............................................. F16L 37/28
[52] U.S. Cl. ........................... 137/614.05; 137/614.03; 251/264
[58] Field of Search ............. 137/614, 614.02, 614.03, 137/614.04, 614.05; 251/149.2, 149.4, 149.6, 213, 251, 264, 265; 285/308, 354; 403/22, 11, 359, 81, 17

[56] References Cited

U.S. PATENT DOCUMENTS

| | | | |
|---|---|---|---|
| 1,484,740 | 2/1924 | Rubino | 251/264 |
| 1,906,313 | 5/1933 | Clifford | 251/264 |
| 2,892,608 | 6/1959 | Collins | 403/81 X |
| 4,289,414 | 9/1981 | Recker | 403/17 X |
| 5,139,049 | 8/1992 | Jensen et al. | 137/614.03 X |
| 5,156,483 | 10/1992 | Mangas | 403/359 X |

*Primary Examiner*—Martin P. Schwadron
*Assistant Examiner*—Kevin L. Lee
*Attorney, Agent, or Firm*—Spencer, Frank & Schneider

[57] ABSTRACT

A service adapter includes a hollow adapter body; a valve seat in the adapter body; a threaded spindle threadedly engaging the adapter body and extending thereinto; a turning knob attached to the spindle, whereby a rotation of the turning knob effects a rotation and a linear displacement of the spindle relative to the adapter body; a valve stem disposed in the adapter body and adjoining the spindle; a valve body attached to the valve stem and cooperating with the valve seat; and a coupling connecting the spindle with the valve stem for transmitting from the spindle to the valve stem forces derived substantially solely from the linear displacement of the spindle. In this manner no appreciable tangential (circumferential) forces are applied to the valve stem to substantially prevent rotation of the valve stem and the valve body.

4 Claims, 1 Drawing Sheet

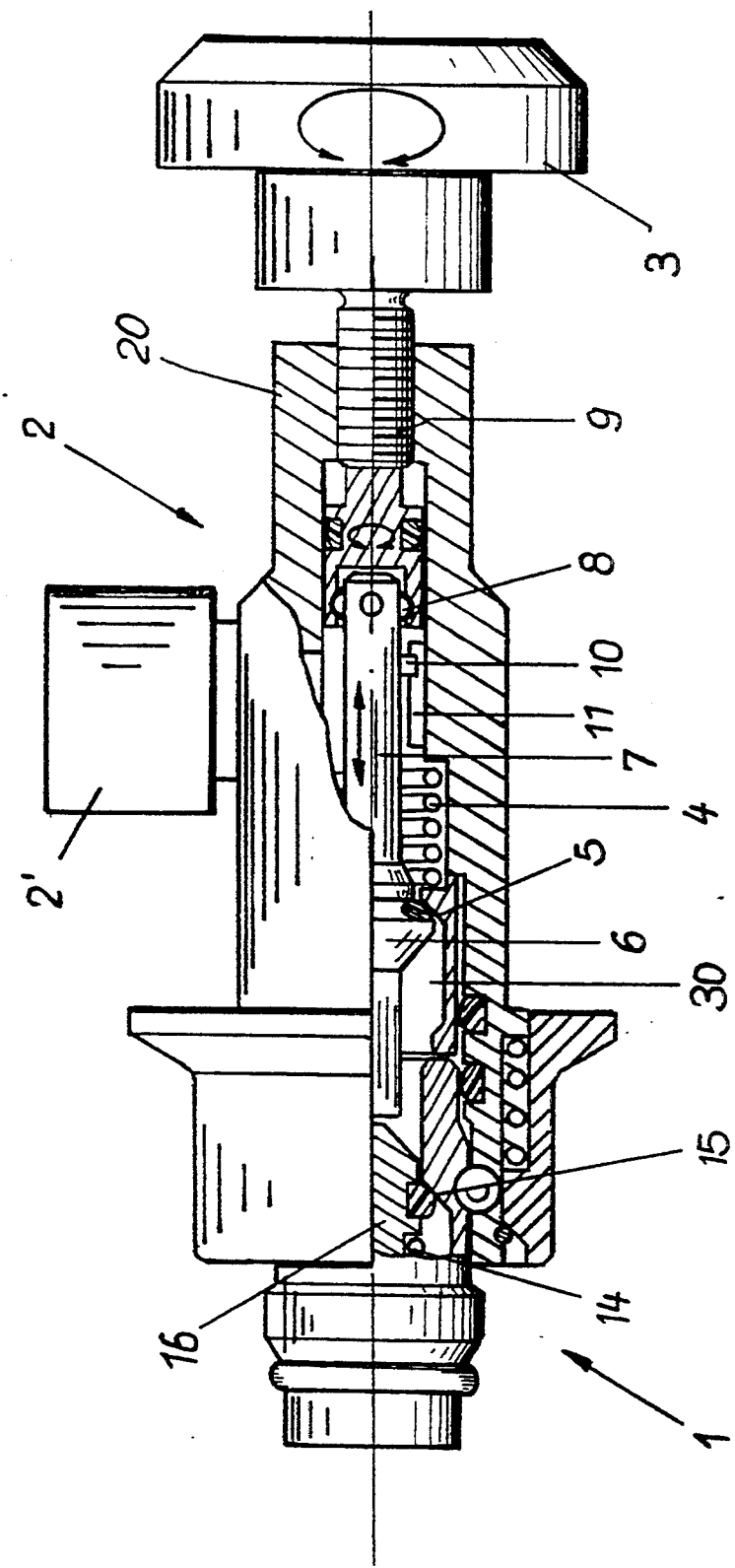

REGULATING MECHANISM FOR THE SERVICE ADAPTER OF A SERVICE COUPLING COOPERATING WITH A CHARGING PORT PART

FIELD OF THE INVENTION

The present invention relates to a regulating mechanism for the service adapter of a service coupling cooperating with a charging port part, the mechanism being particularly suitable for servicing refrigeration systems or the like. The mechanism further comprises a valve stem carrying a valve body which cooperates with a compression spring biased valve seat axially displaceable by means of a knob.

BACKGROUND OF THE INVENTION

Servicing couplings of the aforedescribed kind are generally employed to permit the charging and evacuation of the refrigeration circuit of refrigeration systems. For this purpose the charging port part and the service adapter are connected to each other, whereupon the self-sealing valve of the charging port part is opened. The flow of refrigerant through the service adapter is generally controlled by a manually operated adapter valve.

A fundamental problem with such known service couplings exists, however, in the axially adjustable adapter valve, which is under great breech-closing spring pressure since, as a result of the rotation of the valve stem acting as spindle for the axial displacement of the valve body relative to the valve seat, great tangential force is present between the valve body and the valve seat, which force quickly destroys the valve seal, so that the service adapter becomes leaky to a critical degree after little use.

SUMMARY OF THE INVENTION

It is thus an object of the present invention to provide a regulating mechanism for such service adapters which eliminates the aforementioned disadvantage of known specific embodiments.

This object is achieved by the present invention, according to which the valve stem carrying the valve body is connected by means of a coupling to a knob, or to the spindle thereof such that rotation of the valve stem as a result of an actuation of the knob is at least partially prevented.

As a result of these steps, upon actuation of the knob spindle, an axial relative motion between the valve body and the valve seat occurs without any extensive tangential force components, so that no wear can result on the valve seal upon actuation of the knob spindle.

A simple, maintenance-free and reliable improvement of the regulating mechanism can be provided where the coupling is a ball-and-socket joint between the valve stem and the knob-spindle. In addition, the improvement may also be such that rotation is prevented by the provision of a cam and an axial groove is between the valve stem and the adapter body.

BRIEF DESCRIPTION OF THE DRAWING

An embodiment of the present invention will now be more particularly described by way of example and with reference to the accompanying drawing, in which:

FIG. 1 is a partially sectional, side elevational view of a service coupling including a charging port part and a service adapter.

DETAILED DESCRIPTION OF THE PREFERRED EMBODIMENT

With reference to the description, the service coupling comprises in this case a charging port part mounted upon the refrigeration circuit component (not shown in detail here.) The circuit component may constitute tubing, a reservoir, or other components. The service adapter 2 is connectable to the charging port part 1 and is in flow connection by a supply fitting 2' and by a hose, (not shown), to a bottle or cylinder, (not shown), containing pressurized refrigerant. In this known system, self-sealing valve means 5, 6 or 15, 16 are located within the coaxial flow passage 30 in the body 20 of the adapter 2 or in the charging port 1, whereby these valve means are in known manner biased by spring means 4 or 14 and assure that upon a separation of adapter and charging port, the valves thereof close immediately.

In addition to this and in known manner, the valve 5, 6 of the service adapter is manually operable. For this purpose, a threaded spindle 9 provided with a knob 3 penetrates the free front end of the adapter body 20, bringing about an axial displacement of the valve body 6.

According to the invention, the valve stem 7 carrying the valve body 6 is connected by means of the coupling 8 to the knob 3 or the threaded spindle 9 thereof, thus valve body 6.

The coupling is preferably a ball-and-socket joint 8 between the valve stem 7 and the knob-spindle 9.

In principle, the coupling pressure between the two valve bodies 16 and 6 is sufficient to prevent any rotation of the valve body 6 upon actuating the threaded spindle 9, at least so long until the valve body 6 has been lifted off its valve seat 5.

Moreover, an increased protection against rotation can also be achieved by the provision of a cam 10 and an axial groove 11 between the valve stem 7 and adapter body 20. As seen in the sectional Figure, the cam 10 is carried by the valve stem 7 and the axial groove is provided on an inner face of the body 20. The cam 10 extends into and is thus linearly guided by the groove 11 and consequently the valve stem 7 is positively prevented from rotating (even if it is urged to do so by any weak torque which may be transmitted from the rotary spindle to the valve stem 7 because of a frictional force between the balls and the socket of the coupling 8).

Thus, from the foregoing, there results a service coupling whereby actuation of the knob-spindle results in an axial relative motion between the valve body and the valve seat which occurs without any appreciable tangential force components, such that no wear can result on the valve seal from an actuation of the knob-spindle.

While a preferred embodiment of the invention has been shown and described it is to be understood that the invention is not limited thereto, but may be otherwise variously embodied and practiced within the scope of the following claims.

What I claim is:

1. A service adapter comprising:
   (a) a hollow adapter body;
   (b) means for defining a valve seat in the adapter body;
   (c) a threaded spindle threadedly engaging said adapter body and extending thereinto;
   (d) a turning knob attached to said spindle, whereby a rotation of the turning knob effects a rotation and a linear displacement of the spindle relative to the adapter body;

(e) a valve stem disposed in said adapter body and adjoining said spindle;

(f) a valve body attached to said valve stem and cooperating with said valve seat; and (g) coupling means connecting said spindle with said valve stem for transmitting from said spindle to said valve stem forces derived substantially solely from the linear displacement of the spindle, whereby no appreciable tangential forces are applied to said valve stem to substantially prevent rotation of said valve stem and said valve body.

2. The service adapter as defined in claim 1, further comprising spring means disposed in said adapter body for urging said valve seat toward said valve body.

3. The service adapter as defined in claim 1, wherein said coupling means comprises a ball-and-socket joint transmitting from said spindle to said valve stem forward and rearward displacing forces derived from forward and rearward linear displacements of the spindle.

4. The service adapter as defined in claim 1, further comprising a cam carried by said valve stem and means defining a linear groove in said adapter body; said cam projecting into said groove and being linearly guided therein upon displacements of said valve stem for preventing rotation of said valve stem during said displacements.

* * * * *